United States Patent [19]

Shelby et al.

[11] 4,115,342

[45] * Sep. 19, 1978

[54] WIRE ENAMEL WITH LOW SOLDERING TEMPERATURE

[75] Inventors: Thomas A. Shelby; Shelby W. Gallien, both of Fort Wayne, Ind.

[73] Assignee: Rea Magnet Wire Co., Inc., Fort Wayne, Ind.

[*] Notice: The portion of the term of this patent subsequent to Oct. 26, 1993, has been disclaimed.

[21] Appl. No.: 722,824

[22] Filed: Sep. 13, 1976

Related U.S. Application Data

[63] Continuation-in-part of Ser. No. 564,851, Apr. 3, 1975, Pat. No. 3,988,283.

[51] Int. Cl.$^2$ .......................... C08K 5/01; C08K 5/13; C08L 79/08; H01B 3/22
[52] U.S. Cl. .............................. 260/33.4 P; 252/63.7; 260/33.40 R; 260/33.60 B; 260/33.6 R; 428/378; 428/379
[58] Field of Search .................... 260/33.4 P, 33.40 R, 260/33.60 B; 252/63.7; 428/379

[56] References Cited

U.S. PATENT DOCUMENTS

| | | |
|---|---|---|
| 3,514,500 | 5/1970 | Osmond et al. ....................... 260/34.2 |
| 3,652,471 | 3/1972 | Sattler ............................ 260/33.40 R |
| 3,697,471 | 10/1972 | Schmidt et al. .................. 260/33.4 P |
| 3,793,250 | 2/1974 | Schmidt et al. .................. 260/33.4 P |
| 3,852,246 | 12/1976 | Schmidt et al. .................. 260/33.4 P |
| 3,896,089 | 7/1975 | Noda et al. ....................... 260/33.4 P |

*Primary Examiner*—Allan Lieberman
*Attorney, Agent, or Firm*—William J. O'Rourke, Jr.

[57] ABSTRACT

A wire enamel coating composition capable of forming an insulative coating on a wire to provide a solderability of less than 1 second at temperatures as low as 285-315° C and a thermoplastic flow temperature of at least 230° C comprising a predetermined ratio of an imidized polyester resin having a free hydroxyl content of 4-10% by weight and a blocked isocyanate; at least one aromatic solvent, and a catalyst.

8 Claims, 1 Drawing Figure

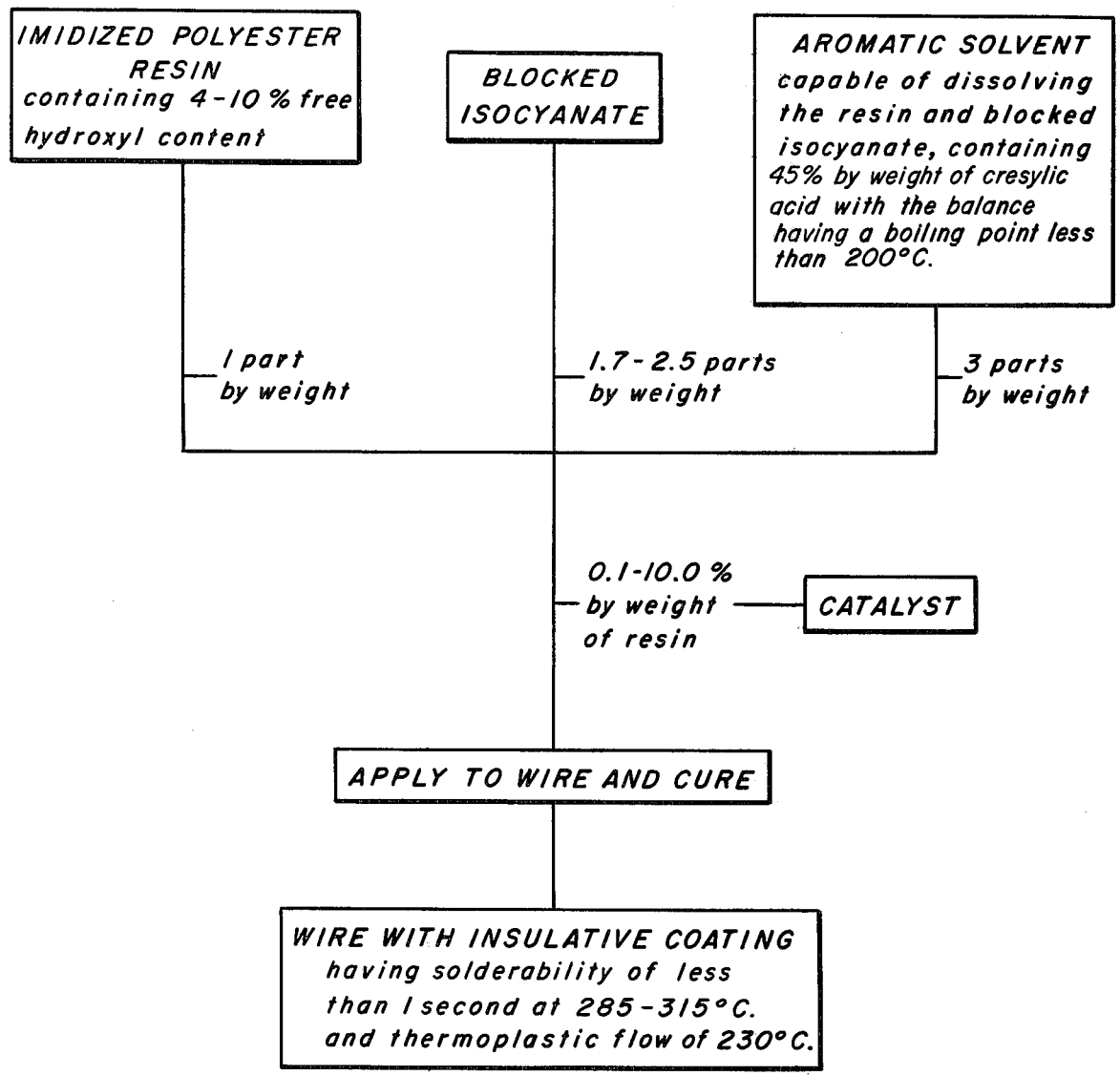

WIRE ENAMEL WITH LOW SOLDERING TEMPERATURE

RELATED APPLICATIONS

This application is a continuation-in-part of Ser. No. 564,851 filed Apr. 3, 1975, now U.S. Pat. No. 3,988,283.

BACKGROUND OF THE INVENTION

This invention relates to wire enamel. More particularly, this invention relates to a coating composition capable of forming an insulative coating on wire to provide a very low temperature solderability while maintaining satisfactory insulative properties.

Requirements for fast and reliable soldering require increased use of preassembled components which are subsequently dipped into a solder pot to decompose the insulation from the wire, for example, and cause it to be at the same time soldered to a terminal. The speed requirement in addition to the presence of other plastic materials in the preassembled package necessitates an insulated coating which will be capable of melting or disintegrating at as low a temperature as possible. Conversely, however, increased safety requirements mandate the need for an insulative material which will be capable of withstanding temporarily higher than normal operating temperatures such as, for example, when a short occurs causing a wire to heat up. This latter property can be defined as thermoplastic flow. Prescribed testing procedures by the National Electrical Manufacturers Association (NEMA) define the conditions under which the thermoplastic flow temperature of a wire is determined. (MW-1000-1973, procedure 50.)

Basically, the need for a low solderability temperature is, for most materials, the antithesis of the equally important need for good high-temperature insulation properties such as a high thermoplastic flow temperature. Quite surprisingly, however, we have found a particular coating composition which provides a surprisingly low solderability temperature yet provides a satisfactory thermoplastic flow temperature.

SUMMARY OF THE INVENTION

In accordance with the invention, a wire enamel coating composition capable of forming an insulative coating on a wire is provided, characterized by a solderability of less than 1 second at a temperature of about 285°-315° C and a thermoplastic flow temperature of at least 230° C and comprising 1 part by weight of coating composition of a resin mixture containing 1 part by weight of an imidized polyester resin containing 4-10% by weight free hydroxyl content, and 1.7-2.5 parts by weight of a blocked isocyanate; about 3 parts by weight of the coating composition of an aromatic solvent capable of dissolving the resin and the blocked isocyanate and containing at least 45% by weight of cresylic acid; and 0.1-10.0% by weight of said resin mixture of a catalyst is used to accelerate the reaction between the imidized polyester resin and the blocked isocyanate.

BRIEF DESCRIPTION OF THE DRAWING

The sole drawing of the invention is a flowsheet illustrating the components.

DESCRIPTION OF THE PREFERRED EMBODIMENTS

In accordance with the invention, a wire enamel is prepared by mixing together about 1 part by weight of an imidized polyester resin containing 4-10% by weight free hydroxyl content with about 1.7-2.5 parts by weight of a blocked isocyanate. The resulting solids are dissolved in an aromatic solvent in a ratio of 1 party by weight resin per 3 parts by weight of solvent to create a resin solution.

The imidized polyester resin is the esterification product of a diol with an imidized dicarboxylic acid having the general formula:

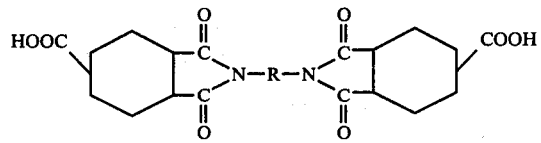

This imidized dicarboxylic acid is generally the reaction product of a diamine with trimellitic acid or its anhydride in a molar ratio of about 1 mole diamine per 2 moles of the trimellitic compound. Thus, the free carboxylic acid groups shown in the formula are always in the meta or number 4 position with respect to the imide groups. The R group can be aliphatic, aromatic or a combination of aliphatic and aromatic depending upon the initial diamine used such as, for example, 1, 6 hexane diamine, p-phenylenediamine, and methylene dianiline.

The diol with which the imidized dicarboxylic acid is condensed may be any common diol such as, for example, ethylene glycol, 1, 2 propane diol, 1, 3 propane diol or 1, 2 butane diol, 1, 3 butane diol, or 1, 4 butane diol.

The imidized dicarboxylic acid and the diol are esterified to an acid number of about 5-12 to provide a free hydroxyl content of about 4-10%. Preferably this is obtained by adding a dicarboxylic acid or ester to the esterification such as, for example, dimethyl isophthalate.

An example of a commercially available imidized polyester resin of the above type is Terasod 357 available from the P. D. George Company which comprises the reaction product of trimellitic acid or anhydride with methylene dianiline and condensed with ethylene glycol. This resin has an acid number range of about 5-12, and a free hydroxyl content of about 4-8%.

The blocked isocyanate may be a diisocyanate having both of the isocyanate groups blocked. An example of such material would be the reaction product of a molar amount of trimethylol propane with 3 moles of toluene diisocyanate with the free isocyanate groups of the reaction product blocked by an appropriate blocking agent such as phenol or other equivalent hydroxy compounds. Other blocked isocyanates useful in the invention are described in U.S. Pat. No. 3,650,788. Examples of materials commercially available include Mondur S available from the Mobay Chemical Company or PDG 710 available from the P. D. George Company of St. Louis.

The aromatic solvents may comprise one or morre of a number of materials containing at least 45% by weight of cresylic acid and must provide sufficient solubility for the urethane and isocyanate resins discussed above. The balance of the solvent may be one or more aromatic hydrocarbons such as xylene, toluene, benzene or the like.

In a preferred embodiment, the solvent comprises 45-70% by weight of cresylic acid 0-50% by weight of WES oil, and 0-30% by weight of xylene wherein the sum total amount of WES oil and xylene equals 30–50% by weight.

In this preferred embodiment, cresylic acid has a boiling point of at least 200° C, and the balance of the solvent has a boiling point of less than 200° C.

In an alternate embodiment, the solvent in the coating composition comprises approximately 70% by weight of cresylic acid, and approximately 30% by weight of xylene.

In the most preferred embodiment, the aromatic mixture of solvents comprises about 48–52% by weight of cresylic acid, about 24–26% by weight of a high boiling aromatic solvent known in the trade as WES oil (wire enamel solvent), and 24–26% by weight of xylene. WES oil is a semi-refined coal tar distillate, straw to dark amber in color, characterized by distillation of 10% to not below 165° C, 70% to not above 190° C and 95% to not above 235° C.

An appropriate catalyst is used to promote the reaction of the imidized polyester resin with the blocked isocyanate. Such catalysts are well known to those skilled in the art. The catalyst is added in an amount of 0.1 to 10.0% by total weight of the solids, and preferably about 0.5–2.0% by total weight of solids. A preferred catalyst is Rubber Accelerator 808, a butyraldehyde-aniline condensation product available from the E. I. duPont de Nemours Company.

To further illustrate the invention, a wire enamel coating composition was made using 1 part by weight of Terasod 357 imidized polyester resin solids, 2 parts by weight PDG 710 blocked isocyanate resin solids, 4.5 parts by weight cresylic acid, 2.25 parts by weight WES oil, and 2.25 parts by weight xylene. To this composition was added 1% by total weight of the Terasod 357 and PDG 710 of duPont Rubber Accelerator Catalyst 808. The composition was applied to a No. 37 AWG copper wire to provide an average coating thickness of 0.00035 inch or an increase in wire diameter of 0.0007 inch. The coating was cured in a conventional continuous wire enameling oven with a bottom oven zone to top oven zone temperature range of 120°–350° C during a residence time of 15 seconds per coat with 3 coats applied. The sample of the coated wire was then assembled to a test fixture and dipped into a soldering pot at 302° C (575° F). (NEMA MW-1000-No. 12). The conductor was found to be tinned satisfactorily in less than 1 second at this temperature.

To further test the efficacy of the coating composition, the standard NEMA tests such as continuity, dielectric strength, heat shock and thermoplastic flow, were all successfully conducted on the samples. The standard NEMA test (MW-1000-1973-50.1.1) for thermoplastic flow was conducted comprising placing two wires coated with the coating composition in contact at right angles with each wire connected to one terminal of 110-volt A.C. power supply.

A 50 gram weight was placed on the wire and the assembly placed in an oven and the temperature slowly raised at a rate of about 3°–5° C per minute. The wires were connected to an alarm which would sound when the conductors touched one another, signifying that both of the conductors had cut through the insulative coating. On the average, the alarm went off at about 230° C indicating that the wire enamel insulative coating was able to withstand a temperature of up to that point before cutting through.

What is claimed is:

1. A wire enamel coating composition capable of forming an insulative coating on a wire characterized by a solderability of less than 1 second at a temperature of about 285°–315° C and a thermoplastic flow temperature of at least 230° C and comprising:
    (a) 1 part by weight of a coating composition of a resin mixture containing:
        (i) 1 part by weight of an imidized polyester resin containing 4–10% by weight free hydroxyl content, and
        (ii) 1.7–2.5 parts by weight of a blocked isocyanate;
    (b) about 3 parts by weight of the coating composition of an aromatic solvent capable of dissolving said resin and said blocked isocyanate and containing at least 45% by weight of cresylic acid, with the balance of the solvent having a boiling point of less than 200° C; and
    (c) about 0.1 to 10.0% by weight of said resin mixture of a catalyst to promote the reaction of the imidized polyester with the blocked isocyanate.

2. The wire enamel coating composition of claim 1 wherein said imidized polyester resin comprises a diol condensed with the reaction product of trimellitic acid or its anhydride with a diamine.

3. The composition of claim 2 wherein said diol is selected from the group consisting of ethylene glycol; 1, 2 propane diol; 1, 3 propane diol; 1, 2 butane diol; 1, 3 butane diol; and 1, 4 butane diol.

4. The composition of claim 2 wherein said diamine is methylene dianiline.

5. The coating composition of claim 1 wherein said blocked isocyanate comprises the reaction product of trimethylol propane, toluene diisocyanate, and phenol.

6. The coating composition of claim 1 wherein the balance of said solvent is selected from the group consisting of:
    (a) a semi-refined coal tar distillate characterized by distillation of 10% to not below 165° C, 70% to not above 190° C and 95% to not above 235° C;
    (b) xylene; and
    (c) mixtures thereof.

7. The coating composition of claim 6 wherein said solvent comprises:
    (a) 50 to 70% by weight of cresylic acid;
    (b) 0–50% by weight of a semirefined coal tar distillate characterized by distillation of
        (i) 10% to not below 165° C,
        (ii) 70% to not above 190° C, and
        (iii) 95% to not above 235° C; and
    (c) 0 to 30% by weight of xylene, wherein the sum total amount of said coal tar distillate and xylene equals 30 to 50% by weight.

8. The coating composition of claim 6 wherein said solvent comprises approximately 70% by weight of cresylic acid and approximately 30% by weight of xylene.

* * * * *